United States Patent
Nohara et al.

(10) Patent No.: US 9,416,219 B2
(45) Date of Patent: Aug. 16, 2016

(54) CHAIN CURING RESIN COMPOSITION AND FIBER-REINFORCED COMPOSITE MATERIAL

(75) Inventors: Atsushi Nohara, Toyohashi (JP); Manabu Kaneko, Toyohashi (JP); Noriya Hayashi, Minato-ku (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 322 days.

(21) Appl. No.: 13/497,884

(22) PCT Filed: Oct. 4, 2010

(86) PCT No.: PCT/JP2010/067352
§ 371 (c)(1),
(2), (4) Date: Jun. 20, 2012

(87) PCT Pub. No.: WO2011/043288
PCT Pub. Date: Apr. 14, 2011

(65) Prior Publication Data
US 2012/0283352 A1  Nov. 8, 2012

(30) Foreign Application Priority Data
Oct. 8, 2009  (JP) .................................. 2009-234249

(51) Int. Cl.
*C08J 3/28* (2006.01)
*C08L 63/00* (2006.01)
*C08G 59/22* (2006.01)

(52) U.S. Cl.
CPC .............. *C08G 59/226* (2013.01); *C08L 63/00* (2013.01)

(58) Field of Classification Search
CPC .................................................... C08G 59/226
USPC ......................................................... 528/87
See application file for complete search history.

(56) References Cited

U.S. PATENT DOCUMENTS

| | | | |
|---|---|---|---|
| 2005/0215749 A1* | 9/2005 | Miyake et al. ................. | 528/87 |
| 2006/0073343 A1 | 4/2006 | Xu | |
| 2008/0308972 A1 | 12/2008 | Fanget | |
| 2009/0053518 A1* | 2/2009 | Saiki et al. .................... | 428/352 |
| 2009/0184437 A1* | 7/2009 | Hayashi et al. .............. | 264/101 |

FOREIGN PATENT DOCUMENTS

| | | |
|---|---|---|
| EP | 0 463 866 | 1/1992 |
| EP | 1 302 495 | 4/2003 |
| JP | 10-1657 | 1/1998 |
| JP | 11-193322 | 7/1999 |
| JP | 2001-316450 | 11/2001 |
| JP | 2002-256058 | 9/2002 |
| JP | 2003-327785 | 11/2003 |
| JP | 2005-187609 | 7/2005 |
| JP | 2005-307032 | 11/2005 |
| JP | 2006-503154 | 1/2006 |
| JP | 2007-119603 | 5/2007 |
| JP | 2008007558 A * | 1/2008 ................. C09J 4/00 |
| JP | 2008-36997 | 2/2008 |
| JP | 2010-13636 | 1/2010 |
| SU | 404269 | 8/1968 |
| SU | 958448 | 11/1980 |
| WO | 2008/111283 | 9/2008 |
| WO | 2008/153542 | 12/2008 |

OTHER PUBLICATIONS

Saito et al., JP 2008-007558 A machine-generated English translation, Jan. 17, 2008.*
International Search Report issued Nov. 2, 2010 in International (PCT) Application No. PCT/JP2010/067352, of which the present application is the national stage.
Notice of Allowance issued May 8, 2014 in Chinese Application No. 201080044184.1, with English translation.
Notice of Allowance issued Dec. 9, 2013 in Russian Application No. 2012112016.
Notice of Allowance issued Jul. 15, 2013 in corresponding Korean Application No. 10-2012-7008055.
Notice of Allowance issued Jun. 10, 2014, in corresponding Canadian Patent Application No. 2,774,845.
Notice of Allowance issued Nov. 14, 2013 in Taiwanese Application No. 099134492.
Patent Cooperation Treaty (PCT) International Preliminary Report on Patentability issued May 8, 2012 in International (PCT) Application No. PCT/JP2010/067352, of which the present application is the national stage.
Extended European Search Report issued Nov. 21, 2015 in corresponding Application No. 10821958.5.
Notice of Allowance issued May 12, 2016 in corresponding European Application No. 10 821 958.5.

* cited by examiner

*Primary Examiner* — David Karst
(74) *Attorney, Agent, or Firm* — Wenderoth, Lind & Ponack, L.L.P.

(57) ABSTRACT

Provided is an RTM moldable chain curing resin composition which can be molded with less energy in a short time, and which makes it possible to obtain a cured product that is superior in mechanical strength. A chain curing resin composition of the present invention includes an alicyclic epoxy compound (A) having two cyclohexene oxides in a molecule and a specific modified bisphenol A-type epoxy resin (B), and the content of the alicyclic epoxy compound (A) is 25 to 90% by mass, when the total of the component (A) and the component (B) is taken as 100% by mass.

18 Claims, No Drawings

CHAIN CURING RESIN COMPOSITION AND FIBER-REINFORCED COMPOSITE MATERIAL

TECHNICAL FIELD

The present invention relates to a chain curing resin composition for a fiber-reinforced composite material, and also to a fiber-reinforced composite material.

BACKGROUND ART

Fiber-reinforced composite materials (hereinafter referred to as FRPs) reinforced with reinforcing fibers have characteristics such as superiority in specific strength, specific rigidity, and the like, as well as being light in weight. By making use of such characteristics, fiber-reinforced composite materials have been widely used for aircraft structural materials, automotive parts, and sport applications such as rackets and golf shafts.

In a general method for molding an FRP, an intermediate material, called a prepreg, obtained by impregnating a reinforcing fiber with a thermosetting resin is used, and the prepreg is cured and molded by autoclave molding, vacuum bag molding, press molding, or the like. A resin for the prepreg needs to have both stability at normal temperature and curability upon application of heat or the like. In general, thermosetting resins such as epoxy resin compositions are often used as the resin.

In addition, methods of molding an FRP without using a prepreg are known. General molding methods without using a prepreg include resin transfer molding (hereinafter sometimes referred to as RTM), vacuum RTM molding, RFI molding, filament winding molding, pultrusion molding, and the like. In these moldings, thermosetting resins having low viscosities such as glycidyl ether-type epoxy, alicyclic epoxy, vinyl ester, and unsaturated polyester resins are used as the resin.

Here, heating for a certain time is necessary for curing a thermosetting resin, and a long time is required for the molding, when the time to raise the temperature to a predetermined temperature, and the time to cool the molded article to a temperature low enough for the molded article to be taken out are also taken into consideration. Hence, there is a limitation in reduction of costs by improving the production cycle. In addition, there is a problem of high energy costs because of continuous heating.

In this respect, molding methods using an ultraviolet curable resin have been developed in recent years as molding methods conducted in a short time without heating. As the ultraviolet curable resin, a radically polymerizable resin such as an acrylic-based resin or a vinyl ester-based resin is used. The radically polymerizable resin is curable upon irradiation with ultraviolet rays in a short time, without heating. Hence, the radically polymerizable resin allows molding in a shorter time and with less energy than those of thermal curing, so that productivity of molding can be remarkably improved. Besides, radically polymerizable resins have a wide variety, including a variety of polymerization initiators, and are readily available at relatively low costs.

However, radically polymerizable acrylic-based resins and vinyl ester-based resins of the ultraviolet curable type are inferior to epoxy-based resins in terms of toughness, elongation, and ease of handling. For this reason, an epoxy resin has been sought which can be cured in a short time with heat or ultraviolet rays, and which makes it possible to efficiently obtain a cured product having superior mechanical strength.

Patent Document 1 describes use of a cationically polymerizable epoxy compound curable with active energy rays as a resin contained in a prepreg.

However, Patent Document 1 fails to specifically describe curing of the cationically polymerizable compound with active energy rays, but employs conventional autoclave molding. Accordingly, molding cost reduction is not achieved. In addition, the resins described in Patent Document 1 are not suitable for RTM molding, because these resins are resins for prepregs, and hence have high viscosity.

Moreover, it is known that bisphenol A-type epoxy resins having a flexible skeleton such as an oxyalkylene group are used in RTM molding. However, cured products of conventional modified bisphenol A-type epoxy resins do not have sufficient mechanical strength.

Patent Document 2 describes an RTM molding method which enables curing with heat or ultraviolet rays in a short time, and efficient molding of a cured product having superior mechanical strength. The molding method is characterized by the use of a resin composition described in Patent Document 3, which is referred to as a CCP (chain curing-type resin composition). The resin composition is such that when heat or ultraviolet energy is applied to the resin composition, another kind of first energy different from the energy from an energy source is autogenously generated within the resin, and the same kind of second energy is successively generated by the generated energy, so that the resin composition can be chain cured by means of the first and second energies, or both the first and second energies and the energy from the energy source.

However, the resin composition described in Patent Document 3 has a problem that a cured product of the resin composition is poor in mechanical strength.

PRIOR ART DOCUMENT

Patent Documents

[Patent Document 1] Japanese Patent Application Publication No. 2007-119603
[Patent Document 2] Japanese Patent Application Publication No. 2008-36997
[Patent Document 3] Japanese Patent Application Publication No. Hei 11-193322

SUMMARY OF THE INVENTION

Problems to be Solved by the Invention

An object of the present invention is to provide an RTM moldable chain curing resin composition which can be molded with less energy in a short time, and which makes it possible to obtain a cured product that is superior in mechanical strength. Another object of the present invention is to provide a fiber-reinforced composite material that is superior in mechanical strength.

Means for Solving the Problems

In conventional bisphenol A-type epoxy resins having a flexible skeleton such as an oxyalkylene group, bisphenol A and the flexible skeleton are linked by ester linkage. Such conventional modified bisphenol A-type epoxy resins cannot sufficiently exhibit flexibility, presumably because of increased intermolecular cohesive force due to strong acidity of the ester linkage, and hence the molecules restrain their flexible skeletons with one another. Presumably for this reason, cured products that are superior in mechanical strength cannot be obtained from chain curing resin compositions containing conventional modified bisphenol A-type epoxy resins. In this respect, the present inventors have made a study to develop a modified bisphenol A-type epoxy resin which makes it possible to obtain a cured product excellent in mechanical strength, with attention focused on the linkage between bisphenol A and the flexible skeletons. As a result, the present inventors have invented the following chain curing composition.

Specifically, the present invention includes the following aspects.

[1] A chain curing resin composition comprising:
an alicyclic epoxy compound (A) having two cyclohexene oxides in a molecule; and
a modified bisphenol A-type epoxy resin (B) represented by the following formula (1), wherein
in the modified bisphenol A-type epoxy resin (B), each R1 is —CH(CH3)-, and R2 is an oxyalkylene group, and
the content of the alicyclic epoxy compound (A) is 25 to 90% by mass, where the total of the component (A) and the component (B) is taken as 100% by mass, (in the formula (1), n is an integer of 1 or greater):

[Chem. 1]

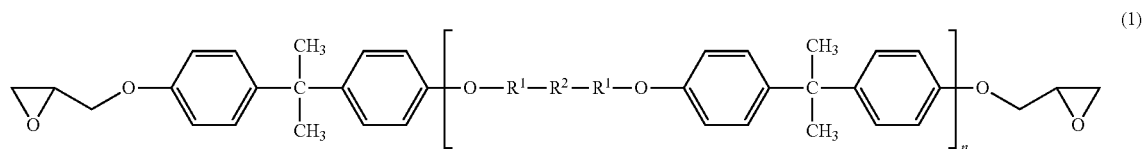

(1)

[2] A chain curing resin composition comprising:
an alicyclic epoxy compound (A) having two cyclohexene oxides in a molecule;
a modified bisphenol A-type epoxy resin (B) represented by the following formula (1); and
a liquid bisphenol-type epoxy resin (C), wherein
in the modified bisphenol A-type epoxy resin (B), each R1 is —CH(CH3)-, and R2 is an oxyalkylene group, and
the content of the alicyclic epoxy compound (A) is 25 to 90% by mass, where the total of the component (A), the component (B), and the component (C) is taken as 100% by mass,
(in the formula (1), n is an integer of 1 or greater):

[Chem. 2]

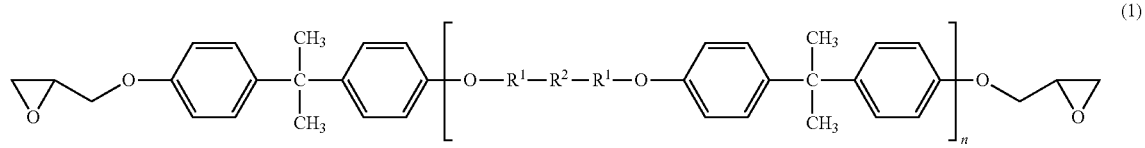

(1)

[3] The chain curing resin composition according to [1] or [2], further comprising both a thermal cationic polymerization initiator and a photo-cationic polymerization initiator.

[4] A fiber-reinforced composite material, which is obtained by molding the chain curing resin composition according to any one of [1] to [3] by a resin transfer molding method.

Effects of the Invention

The fiber-reinforced composite material of the present invention is to provide an RTM-moldable chain curing resin composition which can be molded with less energy in a short time, and makes it possible to obtain a cured product that is superior in mechanical strength.

MODES FOR CARRYING OUT THE INVENTION

A chain curing resin composition of the present invention comprises an alicyclic epoxy compound (A) and a modified bisphenol A-type epoxy resin (B) as essential components, and a liquid bisphenol-type epoxy resin (C) and cationic polymerization initiators as optional components.

'Alicyclic Epoxy Compound (A)'

The alicyclic epoxy compound (A) is a compound having two cyclohexene oxide groups in a molecule, as represented by the formula (2).

Specific examples of the alicyclic epoxy compound (A) include CELLOXIDE 2021P (Formula (3)) manufactured by Daicel Chemical Industries, Ltd., CELLOXIDE 8000 manufactured by Daicel Chemical Industries, Ltd., and the like.

[Chem. 3]

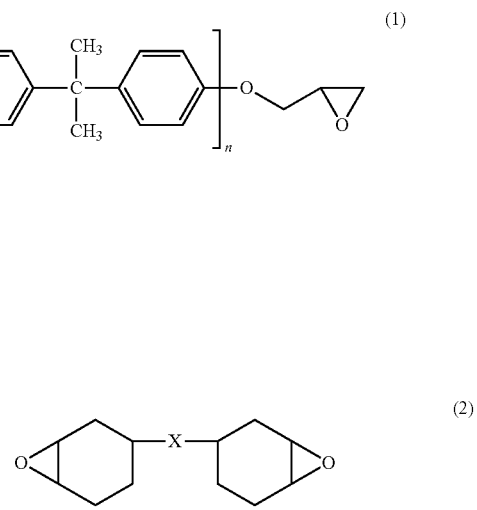

(2)

-continued

[Chem. 4]

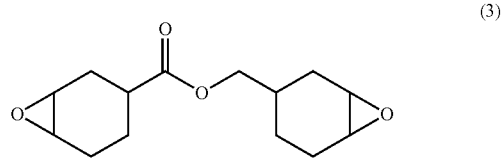

(3)

In the formula (2), X represents any one of alkylene linkages, carbonyl linkages, ether linkages, ester linkages, carbonate linkages, and combinations of multiple of these linkages, or represents no linking group. In the latter case, the cyclohexene oxides are directly bonded to each other in the formula (2).

Of these alicyclic epoxy compounds (A), CELLOXIDE 8000 manufactured by Daicel Chemical Industries, Ltd., is preferable because of excellent chain curability.

'Modified Bisphenol A-Type Epoxy Resin (B)'

The modified bisphenol A-type epoxy resin (B) is a compound represented by the above-described formula (1). The inclusion of the modified bisphenol A-type epoxy resin (B) in the chain curing resin composition leads to improvement in toughness.

In the modified bisphenol A-type epoxy resin (B), R1s are low-polarity linking groups, and specifically are each independently —CH(CH3)-. Meanwhile, R2 is a flexible skeleton, and specifically is oxyalkylene.

In the formula (1), n is an integer of 1 or greater, and is preferably 1 to 3 from the viewpoint of mechanical strength of a cured product; however, a mixture thereof may also be employed.

Of these modified bisphenol A-type epoxy resins (B), a compound represented by the formula (4) is preferable because a cured product thereof has excellent strength and elongation, although the compound has a relatively low viscosity. In the formula (4), n is an integer of 1 or greater.

An example of a product containing the modified bisphenol A-type epoxy resin (B) is EXA 4850-1000 manufactured by Dainippon Ink and Chemicals, Incorporated.

chain curability can be sufficiently high, and the heat resistance of an obtained cured product can be sufficiently high. On the other hand, when the content of the component (A) is 90% by mass or less, the toughness and elongation of a cured product can be sufficiently high.

When no component (C) is contained, the content of the component (B) in the chain curing resin composition is 10 to 75% by mass, preferably 15 to 65% by mass, and further preferably 25 to 60% by mass, where the total of the component (A) and the component (B) is taken as 100% by mass. When the content of the component (B) is 10% by mass or more, the toughness of a cured product of the chain curing resin composition can be sufficiently high. When the content of the component (B) is 75% by mass or less, the chain curability can be high with the viscosity being maintained at a moderate level, and the heat resistance of an obtained cured product can be sufficiently high.

Meanwhile, when the component (C) is contained, the total content of the component (B) and the component (C) in the chain curing resin composition is 10 to 75% by mass, preferably 15 to 65% by mass, and further preferably 25 to 60% by mass, where the total of the component (A), the component (B), and the component (C) is taken as 100% by mass. When the total content of the component (B) and the component (C) is 10% by mass or more, the toughness of a cured product of

[Chem. 5]

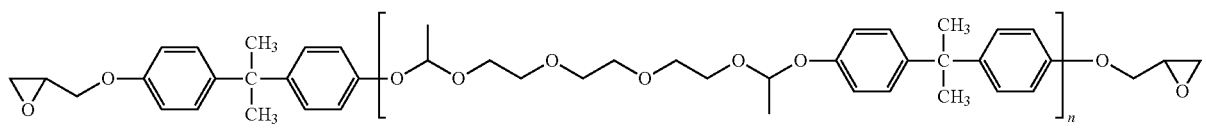

(4)

'Liquid Bisphenol-Type Epoxy Resin (C)'

The chain curing resin composition of the present invention may contain the liquid bisphenol-type epoxy resin (C) for improvement in heat resistance and toughness.

Examples of the liquid bisphenol-type epoxy resin (C) include those having a bisphenol A-type or bisphenol F-type main skeleton or the like, and glycidyl ether groups bonded to both terminals.

Examples of commercially available products of the liquid bisphenol-type epoxy resin (C) include bisphenol F-type epoxy resins such as jER806 and jER807 manufactured by Japan Epoxy Resins Co. Ltd., bisphenol A-type epoxy resins such as jER825, jER827, and jER828 manufactured by Japan Epoxy Resins Co. Ltd., and EPICLON 850S manufactured by Dainippon Ink and Chemicals, Incorporated, and the like.

In addition, an example of a mixture product of the liquid bisphenol-type epoxy resin (C) and the modified bisphenol A-type epoxy resin (B) is EXA 4850-1000 manufactured by Dainippon Ink and Chemicals, Incorporated. The mixture product is preferably one which has a viscosity at 25° C. of 150 Pa·s or less and which is liquid at normal temperature, from the viewpoint of handling.

'Composition Ratio of Components (A) to (C)'

When no component (C) is contained, the content of the component (A) in the chain curing resin composition is 25 to 90% by mass, preferably 35 to 80% by mass, and further preferably 40 to 75% by mass, where the total of the component (A) and the component (B) is taken as 100% by mass. Meanwhile, when the component (C) is contained, the content of the component (A) is 25 to 90% by mass, preferably 35 to 80% by mass, and further preferably 40 to 75% by mass, where the total of the component (A), the component (B), and the component (C) is taken as 100% by mass. When the content of the component (A) is 25% by mass or more, the the chain curing resin composition can be sufficiently high. When the total content of the component (B) and the component (C) is 75% by mass or less, the chain curability can be sufficiently high with the viscosity being maintained at a moderate level, and the heat resistance of an obtained cured product can be sufficiently high.

'Cationic Polymerization Initiator'

Examples of the cationic polymerization initiators include thermal cationic polymerization initiators which generate cationic species upon heating, and photo-cationic polymerization initiators which generate cationic species upon light irradiation, especially ultraviolet irradiation.

A thermal cationic polymerization initiator is a polymerization initiator which generates a cationic species upon heating. A compound such as an aromatic sulfonium salt or an aromatic iodonium salt is preferably used as the thermal cationic polymerization initiator. Examples of commercially available products thereof include SI-60, SI-60L, SI-80L, and SI-100L manufactured by Sanshin Chemical Industry Co., Ltd., and the like. These thermal cationic polymerization initiators may be used alone or as a mixture of two or more. Of these thermal cationic polymerization initiators, SI-60 and SI-60L are preferable, because the chain curability is high, and the mechanical strength of an obtained cured product is higher.

Examples of the photo-cationic polymerization initiator include aromatic diazonium salts, aromatic sulfonium salts, aromatic iodonium salts, metallocene compounds, phosphonium salts, silanol•aluminum complexes, and the like. These may be used alone or as a mixture of two or more.

Of these photo-cationic polymerization initiators, aromatic sulfonium salts and aromatic iodonium salts are preferable because the cationic species is easily generated with ultraviolet rays having relatively low irradiation intensity, and the chain curability is superior.

Examples of commercially available products of the photo-cationic polymerization initiators include UVI-6976 manufactured by The Dow Chemical Company, ADEKA OPTOMER SP-150, SP-170, SP-152, and SP-172 manufactured by Adeka Corporation, WPAG-113, WPAG-145, WPAG-170, WPAG-199, WPAG-281, WPAG-336, and WPAG-367 manufactured by Wako Pure Chemical Industries, Ltd., IRGACURE 250 manufactured by Ciba Specialty Chemicals, and the like. Of these products, UVI-6976 is preferable in terms of excellent curability.

In addition, a photosensitizer may be blended together with the photopolymerization initiator, for the purposes of improving surface curability, of improving ultraviolet sensitivity, and the like.

It is preferable to use the thermal cationic polymerization initiator and the photo-cationic polymerization initiator in combination. The combined use of the thermal cationic polymerization initiator and the photo-cationic polymerization initiator can accelerate the chain curing. This is because polymerization heat is generated due to polymerization caused by the photo-cationic polymerization initiator, and the polymerization heat activates the thermal cationic polymerization initiator, so that the components (A) to (C) are polymerized.

For example, in a case of solutions each containing a polymerization initiator at a concentration of 50% by mass, the amount of the cationic polymerization initiators added is as follows. When no component (C) is contained, the total amount of the solutions added is preferably 1.5 to 5.0 parts by mass, and more preferably 2.0 to 3.5 parts by mass, when the total of the component (A) and the component (B) is taken as 100 parts by mass. Meanwhile, when no component (C) is contained, the total added amount of the each containing a cationic polymerization initiator at a concentration of 50% by mass is preferably 1.5 to 5.0 parts by mass, and more preferably 2.0 to 3.5 parts by mass, where the total of the component (A), the component (B), and the component (C) is taken as 100 parts by mass. When the amount of the cationic polymerization initiators added is 1.5 parts by mass or more, the chain curability can be exhibited with ultraviolet irradiation or even heat. Meanwhile, when the amount of the cationic polymerization initiators added is 5.0 parts by mass or less, curing proceeds at a moderate rate, so that the mold transfer properties are excellent, and a desired shape can be obtained easily. Moreover, excessive cross-linking can be suppressed, and the mechanical strength of a cured product of the chain curing resin composition can be higher. In addition, the amount of the cationic polymerization initiators remaining in a cured product of the chain curing resin composition can be reduced, so that corrosion of a contacting metal due to an acid and the like can be prevented.

'Viscosity of Chain Curing Resin Composition'

The chain curing resin composition of the present invention has a viscosity at 25° C. of preferably 10 Pa·s or less, and more preferably 3 Pa·s or less. When the viscosity at 25° C. is 10 Pa·s or less, the chain curing resin composition can easily be impregnated into a reinforcing fiber at normal temperature.

'Other Components'

The chain curing resin composition of the present invention may contain components other than the chain curing resin such as thermoplastic resins, elastomers, and inorganic fillers, for the purposes of adjusting physical properties of a cured product thereof such as heat resistance, toughness, rigidity, flame retardancy, surface smoothness, reduction in strain, releasability from a mold, and color, as well as handling properties in an uncured state such as tackiness and viscosity.

Preferred examples of the thermoplastic resins which may be contained in the chain curing resin composition include polysulfones, polyethersulfones, polyvinyl formals, phenoxy resins, polystyrenes, polyethylenes, polyacrylates, polysiloxanes, polyphenylene ethers, polyphenylene sulfides, and the like.

Examples of the elastomer components include butadiene rubbers, acrylic rubbers, styrene rubbers, chloroprene rubbers, styrene-butadiene rubbers, butadiene-acrylonitrile rubbers, carboxyl-terminal-modified butadiene-acrylonitrile rubbers, isoprene rubbers, thermoplastic elastomers, and the like.

Examples of the inorganic fillers include metal hydroxides such as aluminum hydroxide and magnesium hydroxide, metal oxides such as magnesium oxide and aluminum oxide, metal carbonates such as calcium carbonate, aluminum carbonate, and magnesium carbonate, glass balloon, silica, mica, talc, wollastonite, and the like.

Moreover, additives such as a defoaming agent, a wetting agent, and a leveling agent may be incorporated into the chain curing resin composition of the present invention, if needed. However, it is not preferable to incorporate a basic substance such as an amine or an amide, because the cationic polymerization is inhibited.

'Method for Preparing Chain Curing Resin Composition'

The chain curing resin composition of the present invention can be prepared by weighing the component (A), the component (B), and the component (C), and mixing these components together at an appropriate temperature by use of a hybrid mixer, a flask, and the like. However, the method for preparing the chain curing resin composition of the present invention is not limited to this preparation method.

'Operation and Effect'

In the chain curing resin composition of the present invention, the linking groups through which the flexible skeleton is linked to bisphenol A in the modified bisphenol A-type epoxy resin (B) have a low polarity. Hence, intermolecular cohesive force is weak, and the molecules are less likely to restrain their flexible skeletons with one another. For this reason, a cured product excellent in mechanical strength can be obtained.

In addition, the chain curing resin composition of the present invention undergoes a chain reaction with a small amount of heat or ultraviolet irradiation. Hence, it is unnecessary to heat a mold for molding in advance. Moreover, once the reaction is initiated, the reaction continues even in darkness. Hence, the mold for molding does not have to have a structure capable of transmitting ultraviolet rays. For this reason, it is possible to conduct RTM molding with less energy and in a short period.

'Fiber-Reinforced Composite Material'

The fiber-reinforced composite material of the present invention is one obtained by molding the chain curing resin composition by a resin transfer molding method (RTM method). Here, the RTM method is a molding method in which the chain curing resin composition is transferred into a mold having a reinforcing fiber placed therein, so that the reinforcing fiber is impregnated with the chain curing resin composition, and then the chain curing resin composition is cured.

Examples of reinforcing fibers usable in the RTM method include carbon fibers, glass fibers, aramid fibers, high-strength polyester fibers, boron fibers, alumina fibers, silicon nitride fibers, nylon fibers, and the like. Of these fibers, carbon fibers are preferable, because the mechanical strength of an obtained cured product is superior.

The mass per unit area of the reinforcing fiber used in the RTM method is not particularly limited, and is preferably 50 to 700 $g/m^2$. When the mass per unit area of the reinforcing fiber is 50 $g/m^2$ or more, failure in design due to noticeable fiber width unevenness or noticeable apertures can be prevented from occurring. When the mass per unit area is 700 $g/m^2$ or less, the chain curing resin composition can be impregnated into the reinforcing fiber in a favorable manner, and the chain curability of the resin impregnated into the reinforcing fiber can be improved.

When a carbon fiber is used as the reinforcing fiber, the amount of the chain curing resin composition impregnated into the reinforcing fiber is preferably 30 to 70% by mass, where the total of the reinforcing fiber and the chain curing resin composition is taken as 100% by mass. When the amount of the chain curing resin composition impregnated into the reinforcing fiber is 30% by mass or more, the luster on a surface of a cured product can be increased. When the amount is 70% by mass or less, sufficient mechanical characteristics can be exhibited.

'Mold Release Sheet'

When chain curing RTM molding is performed by use of the reinforcing fiber, it is preferable to place a mold release sheet between the surface of a mold and the reinforcing fiber. When a mold release sheet is placed, not only a molded article can be more easily taken out from the mold after molding, but also the mold release sheet can have a function as a heat insulator for preventing dissipation of heat generated during the chain curing to the outside of the system.

The material of the mold release sheet is not particularly limited, and examples thereof include glass cloths coated with polytetrafluoroethylene. Examples of commercially available products thereof include 234 TFP and 234 TFNP manufactured by Airtech International Inc., 200 TFP and 200 TFNP manufactured by Richmond Aircraft Products, Inc., and the like.

A curing temperature in the RTM method is preferably 140 to 200° C. Meanwhile, a curing time is preferably 1 to 5 hours. When these are within such ranges, sufficient curing can be achieved in a short time at low costs.

The fiber-reinforced composite material of the present invention is excellent in mechanical strength, because the fiber-reinforced composite material is obtained by molding the chain curing resin composition by the resin transfer molding method.

EXAMPLES

Hereinafter, the present invention is described more specifically on the basis of Examples and Comparative Examples.

(Materials Used)

Materials used in Examples and Comparative Examples are as listed in Table 1.

plates each having a diameter of 25 mm, with the thickness of a resin composition between the parallel plates being 0.5 mm, under a condition of an angular speed of 10 rad/s.

(Measurement of Chain Curing Rate)

A resin composition was poured into a graduated Pyrex (Registered Trademark) glass tube having an outer diameter of 9 mm and an inner diameter of 7 mm, and, as a heat source, a wire heated with a heat gun was brought into contact with the top end of the resin composition, so that chain curing of the resin composition was caused. Then, based on the phenomenon that a chain curing proceeds downward in a glass tube, the time required for the chain curing to proceed 10 cm in the glass tube was measured.

(Molding of Thermally Cured Resin Plates)

A mold in which a polytetrafluoroethylene spacer having a thickness of 2 mm was interposed and fixed between two glass plates was prepared in advance, and a resin composition was transferred into the mold. After that, the resin composition was held at room temperature for a whole day and night to thereby allow the viscosity to increase. After checking that the viscosity of the resin composition reached a state where the resin composition did not flow, the resin composition was thermally cured at 180° C. for 2 hours by use of an oven. Thus, each thermally cured resin plate was obtained.

(Measurement of Glass Transition Temperature Tg)

The thermally cured resin plate was processed into a predetermined test piece (55 mm in length×12.7 mm in width×2 mm in thickness), and was measured for storage elastic modulus G' by use of a rheometer ARES-DMA manufactured by TA Instruments, at a measuring frequency of 1 Hz and a rate of temperature rise of 2° C./min. The measured values were logarithmically plotted against temperature. Then, the temperature at an intersection of an approximate straight line of a flat region of log G' and an approximate straight line of a region where G' showed transition was found, and the temperature was taken as the glass transition temperature (G'-Tg). Note that the glass transition temperature is indicative of heat resistance.

(Measurement of Bending Physical Properties of Thermally Cured Resin Plates)

The thermally cured resin plate was processed into a predetermined test piece (60 mm in length×8 mm in width×2 mm

TABLE 1

| Kind | Product Name | General name | Manufacturer |
| --- | --- | --- | --- |
| Alicyclic epoxy compound (A) | CELLOXIDE 2021P | Alicyclic epoxy compound | Daicel Chemical Industries, Ltd. |
| | CELLOXIDE 8000 | Alicyclic epoxy compound | Daicel Chemical Industries, Ltd. |
| Modified bisphenol A-type epoxy resin (B) | EXA 4850-1000 | Glycidyl ether-type epoxy resin | Dainippon Ink and Chemicals, Incorporated |
| Liquid bisphenol-type epoxy resin (C) | jER807 | Glycidyl ether-type epoxy resin | Japan Epoxy Resins Co. Ltd. |
| | jER828 | Glycidyl ether-type epoxy resin | Japan Epoxy Resins Co. Ltd. |
| Other resins | CELLOXIDE 3000 | Alicyclic epoxy compound | Daicel Chemical Industries, Ltd. |
| | BPA328 | Bis A diglycidyl ether containing dispersed acrylic rubber | Nippon Shokubai Co., Ltd. |
| | HP4032 | Diglycidyl ether having naphthalene skeleton | Dainippon Ink and Chemicals, Incorporated |
| Thermal cationic polymerization initiator | SI-60 | Aromatic sulfonium salt | Sanshin Chemical Industry Co., Ltd. |
| Photo-cationic polymerization initiator | UVI-6976 | Aromatic sulfonium salt | The Dow Chemical Company |

The viscosity and the chain curing rate of resin compositions of Examples and Comparative Examples were measured as follows. In addition, the glass transition temperature and the bending physical properties of cured products obtained from the resin compositions of Examples and Comparative Examples were measured as follows.

(Measurement of Resin Viscosity)

Viscosity was measured at 25° C. by use of a rheometer DSR200 manufactured by Rheometric Scientific, Inc. Specifically, the measurement was conducted by use of parallel in thickness), and measured for bending characteristics by use of a universal testing machine manufactured by Instron equipped with a three-point-bending jig (all the indenter and supports are 3.2 mmR, distance between the supports=actually measured thickness×16 mm). Specifically, bending strength, bending modulus, and elongation at breakage (breakage elongation) of the test piece were measured.

Examples 1 to 12

Components (except for the polymerization initiators) were weighed at the ratio shown in upper rows of Table 2, and uniformly dispersed and dissolved by use of a hybrid mixer HM-500 manufactured by Keyence Corporation. After that, the cationic polymerization initiators were added thereto, and uniformly dispersed and dissolved by use of again HM-500. Thus, each chain curing resin composition was obtained. Results of evaluation conducted on the curable resin compositions as described above are shown in lower rows of Table 2.

In each of Examples 1 to 12, where the alicyclic epoxy compound (A) and the modified bisphenol A-type epoxy resin (B) were contained, the balance among the bending strength, the breakage elongation, the G'-Tg, and the chain curability was excellent.

Examples 13 to 16

Chain curing resin compositions were prepared and evaluate in the same manner as in Examples 1 to 12, except that components were blended at the ratios shown in upper rows of Table 3. The evaluation results are shown in lower rows of Table 3.

In each of Examples 13 to 16, where the alicyclic epoxy compound (A), the modified bisphenol A-type epoxy resin (B), and the liquid bisphenol-type epoxy resin (C) were contained, the balance among the bending strength, the breakage elongation, the G'-Tg, and the chain curability was excellent. In addition, when the amounts of the polymerization initiators added were in a range from 3 to 5 parts by mass, more superior bending strengths were exhibited.

TABLE 2

| | | Example No. | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| A | CELLOXIDE 2021P [% by mass] | | | | | | | 50 | 55 | 60 | 70 | 85 | 40 |
| | CELLOXIDE 8000 [% by mass] | 50 | 62.5 | 50 | 50 | 50 | 50 | | | | | | 10 |
| B | EXA-4850-1000 [% by mass] | 50 | 37.5 | 37.5 | 25 | 30 | 30 | 50 | 45 | 40 | 30 | 15 | 50 |
| C | jER807 [% by mass] | | | 12.5 | 25 | 20 | | | | | | | |
| | jER828 [% by mass] | | | | | | 20 | | | | | | |
| Polymerization initiator | SI-60 50% by mass solution [% by mass] | | | | | | 2.4 | | | | | | |
| | UVI-6976 [% by mass] | | | | | | 0.6 | | | | | | |
| Bending strength [MPa] | | 165 | 151 | 152 | 144 | 154 | 149 | 167 | 171 | 170 | 174 | 145 | 160 |
| Bending modulus [GPa] | | 3.9 | 3.7 | 3.6 | 3.4 | 3.7 | 3.8 | 3.9 | 3.8 | 3.9 | 3.9 | 3.9 | 3.8 |
| Breakage elongation [%] | | 5.7 | 5.0 | 5.1 | 5.5 | 5.5 | 5.0 | 7.4 | 6.2 | 6.0 | 6.0 | 4.4 | 6.2 |
| G'-Tg [° C.] | | 122 | 146 | 132 | 159 | 149 | 156 | 91 | 98 | 104 | 114 | 123 | 120 |
| Chain curing rate [sec/10 cm] | | 71 | 40 | 63 | 54 | 65 | 65 | 328 | 215 | 175 | 124 | 73 | 247 |
| Viscosity at 25° C. [Pa · s] | | 1.6 | 0.79 | 0.98 | 0.46 | 1.2 | 1.5 | 1.8 | 1.6 | 1.3 | 0.7 | — | 2.6 |

(Molding of CFRP by Chain Curing RTM Method)

Twenty four sheets of 3K CF cloth (product number: TR3110M) manufactured by Mitsubishi Rayon Co., Ltd., which was cut into a predetermined size in advance, were stacked on each other in a quasi-isotropic manner. The CF cloth was placed and tightly sealed in a mold for chain curing RTM in which a glass cloth subjected to a mold release treatment in advance was spread. Then, the pressure inside the mold was reduced to vacuum. The resin composition shown in Example 7 was gradually transferred to the mold at room temperature and a pressure of 6 atm. Thus, the CF cloth was impregnate with the resin composition. Irradiation with ultraviolet rays was conducted through an irradiation window provided in a portion of a steel pile used for transferring the resin, to thereby cause the chain curing. Thus, a CFRP plate was molded.

(Measurement of CAI Strength of Chain Cured CFRP)

For Example 7, CAI Strength was measured. The CAI Strength was measured by processing the CFRP, which was molded by chain curing, into a predetermined test piece (150 mm×100 mm×4.8 mm in thickness), then applying an impact of 6.7 J/mm onto the test piece with an impactor, and measuring the area of damaged regions created at that time by use of an ultrasonic flaw detector. The area of the damaged regions was 1142 mm$^2$.

The CAI Strength was measured by use of a material tester manufactured by Instron in accordance with the SACMA standard. The CAI strength was 197 MPa.

TABLE 3

| | | Example No. | | | |
|---|---|---|---|---|---|
| | | 13 | 14 | 15 | 16 |
| A | CELLOXIDE 8000 [% by mass] | | | 50 | |
| B | EXA-4850-1000 [% by mass] | | | 30 | |
| C | jER807 [% by mass] | | | 20 | |
| Polymerization initiator | SI-60 50% by mass solution [% by mass] | 2.4 | 2.8 | 3.2 | 4.0 |
| | UVI-6976 [% by mass] | 0.6 | 0.7 | 0.8 | 1.0 |
| | Total [% by mass] | 3.0 | 3.5 | 4.0 | 5.0 |
| Bending strength [MPa] | | 154 | 149 | 153 | 149 |
| Bending modulus [GPa] | | 3.7 | 3.8 | 3.6 | 3.5 |
| Breakage elongation [%] | | 5.5 | 4.8 | 5.4 | 5.2 |
| G'-Tg [° C.] | | 149 | 138 | 120 | 111 |
| Chain curing rate [sec/10 cm] | | 65 | 62 | 50 | 49 |
| Viscosity at 25° C. [Pa · s] | | 1.2 | 1.2 | 1.1 | 1.1 |

Comparative Examples 1 to 5

Chain curing resin compositions were prepared and evaluated in the same manner as in Examples 1 to 12, except that components were blended at the ratios shown in upper rows of Table 4. The evaluation results are shown in lower rows of Table 4.

In Comparative Example 1, where the ratio of the alicyclic epoxy compound (A) exceeded 90% by mass, the storage elastic modulus G' of the cured product was high, but the bending strength and the breakage elongation thereof were low.

In Comparative Examples 2 to 4, where the ratios of the alicyclic epoxy compound (A) were less than 25% by mass, no chain curability was exhibited.

In Comparative Example 5, where CELLOXIDE 3000, an alicyclic epoxy compound having only one cyclohexene oxide in a molecule was used, no chain curability was exhibited.

TABLE 4

|  |  | Comparative Example No. | | | | |
| --- | --- | --- | --- | --- | --- | --- |
|  |  | 1 | 2 | 3 | 4 | 5 |
| A | CELLOXIDE 8000 [% by mass] | 100 | 20 | 10 |  |  |
| B | EXA-4850-1000 [% by mass] |  | 80 | 90 | 100 | 50 |
| Other resin | CELLOXIDE 3000 [% by mass] |  |  |  |  | 50 |
| Polymerization initiator | SI-60 50% by mass solution [% by mass] | 2.4 |  |  |  |  |
|  | UVI-6976 [% by mass] | 0.6 |  |  |  |  |
| Bending strength [MPa] |  | 103 | — | — | — | — |
| Bending modulus [GPa] |  | 3.9 | — | — | — | — |
| Breakage elongation [%] |  | 3.0 | — | — | — | — |
| G'-Tg [° C.] |  | Unable to measure | — | — | — | — |
| Chain curing rate [sec/10 cm] |  | 6 | No chain curing | | | |
| Viscosity at 25° C. [Pa · s] |  | 0.095 | — | — | — | 0.19 |

INDUSTRIAL APPLICABILITY

The chain curing resin composition of the present invention is suitable for a matrix resin for FRPs, because the chain curing resin composition allows RTM molding with a small amount of heat or ultraviolet irradiation in a short time with less energy, and a cured product thereof has excellent mechanical strength.

The invention claimed is:

1. A chain curing resin composition for a fiber-reinforced composite material comprising:
   an alicyclic epoxy compound (A) having two cyclohexene oxides in a molecule;
   a modified bisphenol A-type epoxy resin (B) represented by the following formula (1);
   a thermal cationic polymerization initiator; and
   a photo-cationic polymerization initiator,
   wherein
   in the modified bisphenol A-type epoxy resin (B), each R1 is —CH(CH3)-, and R2 is an oxyalkylene group, and
   a content of the alicyclic epoxy compound (A) is 25 to 90% by mass, where a total of the component (A) and the component (B) is taken as 100% by mass:

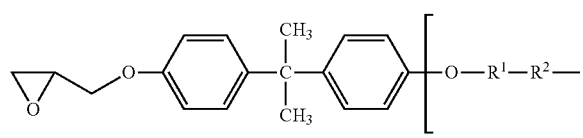

(1)

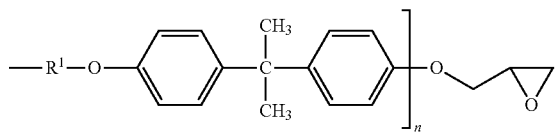

-continued where in the formula (1), n is an integer of 1 or greater.

2. A fiber-reinforced composite material obtained by molding the chain curing resin composition according to claim 1 by a resin transfer molding method.

3. A method of producing the fiber-reinforced composite material of claim 2 comprising,
   transferring the chain curing resin composition into a mold containing a reinforcing fiber,
   impregnating the reinforcing fiber with the chain curing resin composition, and
   curing the chain curing resin composition.

4. The method of producing the fiber-reinforced composite material of claim 3, wherein the reinforcing fiber is selected from the group consisting of carbon fiber, glass fiber, aramid fiber, high-strength polyester fiber, boron fiber, alumina fiber, silicon nitride fiber, and nylon fiber.

5. The method of producing the fiber-reinforced composite material of claim 3, wherein a mass per unit area of the reinforcing fiber is in a range of 50 to 700 g/m$^2$.

6. The method of producing the fiber-reinforced composite material of claim 3, wherein the reinforcing fiber is carbon fiber, and an amount of the chain curing resin composition impregnated into the reinforcing fiber is 30 to 70% by mass based on a total mass of the reinforcing fiber and the chain curing resin composition.

7. The method of producing the fiber-reinforced composite material of claim 3, wherein a mold release sheet is added between a surface of the mold and the reinforcing fiber.

8. The method of producing the fiber-reinforced composite material of claim 7, wherein the mold release sheet is a glass cloth coated with polytetrafluoroethylene.

9. The method of producing the fiber-reinforced composite material of claim 3, wherein curing is carried out at a temperature from 140 to 200° C. for 1 to 5 hours.

10. A chain curing resin composition for a fiber-reinforced composite material comprising:
    an alicyclic epoxy compound (A) having two cyclohexene oxides in a molecule;
    a modified bisphenol A-type epoxy resin (B) represented by the following formula (1);
    a liquid bisphenol-type epoxy resin (C);
    a thermal cationic polymerization initiator; and
    a photo-cationic polymerization initiator,
    wherein
    in the modified bisphenol A-type epoxy resin (B), each R1 is —CH(CH3)-, and R2 is an oxyalkylene group, and
    a content of the alicyclic epoxy compound (A) is 25 to 90% by mass, where a total of the component (A), the component (B), and the component (C) is taken as 100% by mass:

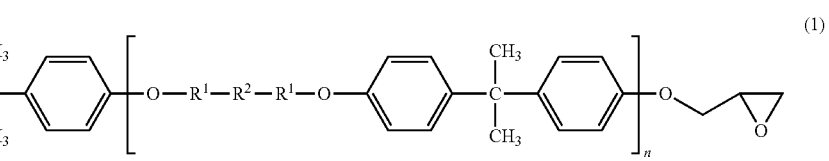

(1)

where in the formula (1), n is an integer of 1 or greater.

11. A fiber-reinforced composite material obtained by molding the chain curing resin composition according to claim 2 by a resin transfer molding method.

12. A method of producing the fiber-reinforced composite material of claim 11 comprising,
transferring the chain curing resin composition into a mold containing a reinforcing fiber,
impregnating the reinforcing fiber with the chain curing resin composition, and
curing the chain curing resin composition.

13. The method of producing the fiber-reinforced composite material of claim 12, wherein the reinforcing fiber is selected from the group consisting of carbon fiber, glass fiber, aramid fiber, high-strength polyester fiber, boron fiber, alumina fiber, silicon nitride fiber, and nylon fiber.

14. The method of producing the fiber-reinforced composite material of claim 12, wherein a mass per unit area of the reinforcing fiber is in a range of 50 to 700 g/m$^2$.

15. The method of producing the fiber-reinforced composite material of claim 12, wherein the reinforcing fiber is carbon fiber, and an amount of the chain curing resin composition impregnated into the reinforcing fiber is 30 to 70% by mass based on a total mass of the reinforcing fiber and the chain curing resin composition.

16. The method of producing the fiber-reinforced composite material of claim 12, wherein a mold release sheet is added between a surface of the mold and the reinforcing fiber.

17. The method of producing the fiber-reinforced composite material of claim 16, wherein the mold release sheet is a glass cloth coated with polytetrafluoroethylene.

18. The method of producing the fiber-reinforced composite material of claim 12, wherein curing is carried out at a temperature from 140 to 200° C. for 1 to 5 hours.

* * * * *